Figure 1:
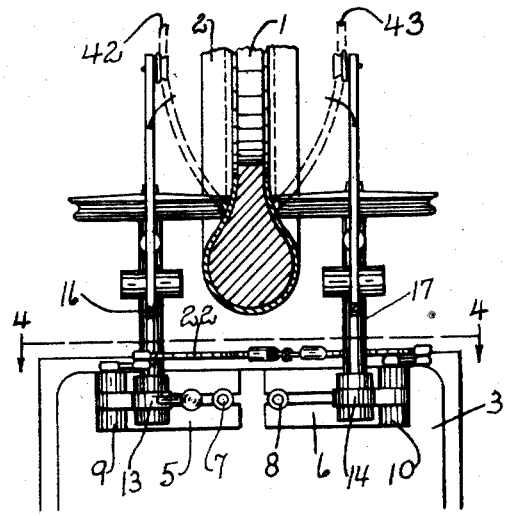

April 30, 1929.   P. W. LEHMAN   1,711,057
BEAD SETTER
Filed Sept. 17, 1926   2 Sheets-Sheet 1

PAUL W. LEHMAN
Inventor
By
Attorney

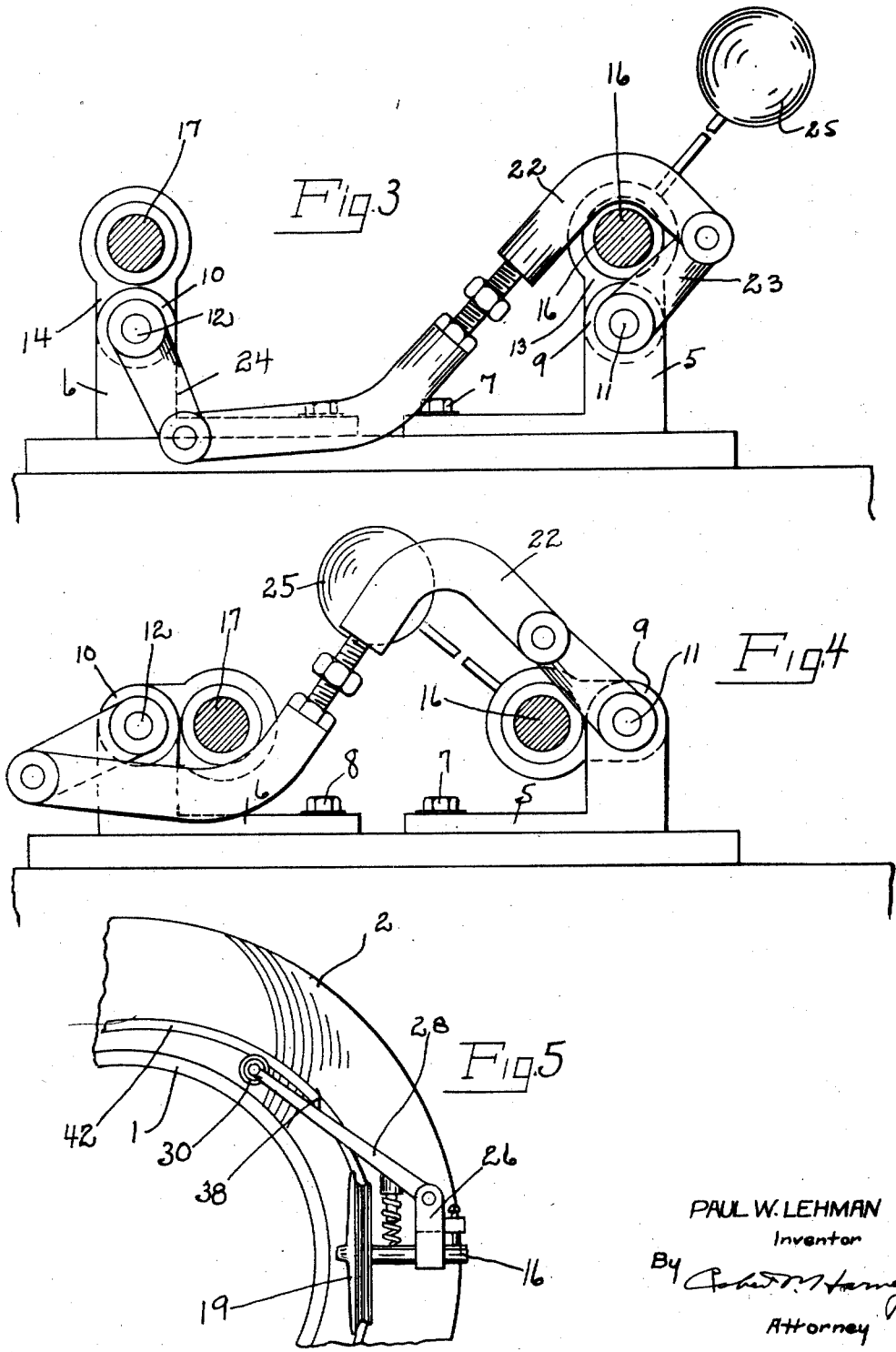

Patented Apr. 30, 1929.

1,711,057

UNITED STATES PATENT OFFICE.

PAUL W. LEHMAN, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

BEAD SETTER.

Application filed September 17, 1926. Serial No. 136,192.

My invention relates to the manufacture of pneumatic tire casings and more particularly to a device for simultaneously setting the bead cores in position on the tire casing. The objects of my invention will be apparent from the following specification and claims.

Referring to the drawings which illustrate one embodiment of my invention

Figure 2:
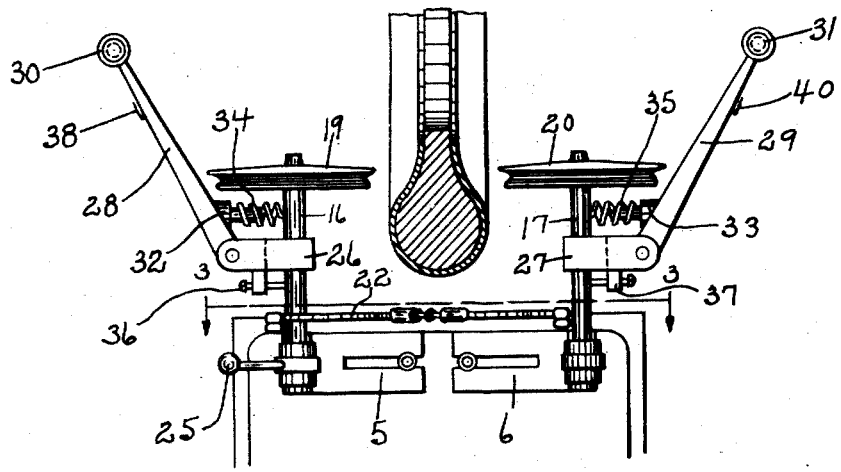

Figure 1 is a plan view showing the bead setters in operative relation with the tire carcass and building core, Figure 2 is a similar view showing the bead setters in inoperative relation, Figure 3 is a section on line 3—3 of Fig. 2, Figure 4 is a cross-section on line 4—4 of Fig. 1, and Figure 5 is a side view showing the parts in substantially the position shown in Fig. 1.

Referring to the drawings 1 indicates a building core of a tire building machine upon which the tire carcass 2 is built. Reference character 3 indicates a portion of the frame of the building machine, to which brackets 5 and 6 are adjustably secured as at 7 and 8 respectively. Brackets 5 and 6 are respectively provided with forked bearings 9 and 10 in which are journaled stub shafts 11 and 12 carrying arms 13 and 14 in the free ends of which are secured horizontal shafts 16 and 17, projecting, as shown in Figures 1 and 2 on opposite sides of the building core. Grooved bead setting rolls 19 and 20 are rotatably mounted on the outer ends of shafts 16 and 17 respectively, the latter being of a length such that rolls 19 and 20 are positioned adjacent the bead portion of the casing 2. Bead setting rolls 19 and 20 are adapted to be simultaneously moved from the position shown in Figure 2 to that shown in Figure 1, and reverse, by rotation of shafts 11 and 12. This is simultaneously accomplished by means of an adjustable link 22 connecting arms 23 and 24 secured respectively to the ends of the stub shafts 11 and 12. The arm 13 is provided with an operative handle 25 and as will be obvious, movement of handle 25 from the position shown in Figure 3 to that in Figure 4 simultaneously moves the roll supporting shafts 16 and 17 inwardly to operative position shown in Figures 1 and 4. Shafts 16 and 17 are provided intermediate their ends with supports 26 and 27 to the free ends of which are pivoted arms 28 and 29 carrying bead supporting rolls 30 and 31. Arms 28 and 29 are provided with inwardly projecting lugs 32 and 33 about which are positioned compression springs 34 and 35 engaging shafts 16 and 17 respectively. The outward movement of arms 28 and 29 under the influence of springs 34 and 35 is limited by adjustable stop members 36 and 37. Arms 28 and 29 are also provided adjacent rolls 30 and 31 with inwardly extending resilient fingers 38 and 40 adapted to releasably maintain the beads on rolls 30 and 31.

In operation with the elements in the position as shown in Figure 2 annular bead elements 42 and 43 are positioned within the grooves of rolls 19 and 20. By means of handle 25 the rolls 19 and 20 are moved into operative position shown in Figure 1 to bring the portion of the bead elements engaged by the rolls into desired relation with the tire carcass 2. The free part of the bead cores are positioned on rolls 30 and 31 and under fingers 38 and 40 as indicated in dotted lines in Figure 1 and full lines in Figure 5. The core 1 is now placed in rotation and rolls 19 and 20 progressively apply the bead cores 42 and 43 in accurate position upon the core. As the starting point is approached the bead cores slip from the supporting rolls 30 and 31, and rolls 19 and 20 complete the application. It will be obvious that by means of my device the two bead cores are set in position simultaneously and in exact position without reliance upon the skill of the operator to accurately position the beads.

I claim:

1. A device for applying annular bead elements to a tire carcass comprising a pair of bead setting members adapted to be simultaneously moved into operative relation with opposite sides of a tire building core, and bead supporting elements associated with said members and positioned to releasably hold the unapplied portions of the bead elements, adjacent the setting members, spaced from the core.

2. A device for applying annular bead elements to a tire carcass comprising a pair of bead setting rolls adaped to be simultaneously moved into operative relation with opposite sides of a tire building core and bead supporting elements associated with said rolls, adapted to maintain annular beads in desired relation to the setting rolls and positioned to releasably hold the unapplied portions of the bead elements, adjacent the setting rolls, spaced from the core.

3. A device for applying annular bead elements to a tire carcass comprising a bead applying member adapted to be moved into operative relation with a tire building core to apply a portion of an annular bead in desired position on a tire carcass positioned on the building core, means associated with said member to releasably support the free portion of the bead annulus in spaced relation to the building core, said member being adapted upon rotation of the building core to progressively apply the annular bead to the tire carcass and said supporting means being adapted to release the bead annulus, as the point of first application approaches, to permit said member to complete the application of the bead.

4. A device for applying annular bead elements to a tire carcass comprising a rotatable grooved roll adapted to be moved into operative relation with a tire building core to apply a portion of an annular bead in desired position on a tire carcass positioned on the building core, means associated with said grooved roll to releasably support the free portion of the bead annulus in spaced relation to the building core, said grooved roll being adapted upon rotation of the building core to progressively apply the annular bead to the tire carcass and said supporting means adapted to release the bead annulus as the point of first application approaches, to permit the grooved roll to complete the application of the bead.

5. A device for applying annular bead elements to a tire carcass comprising a rotatable grooved roll adapted to be moved into operative relation with a tire building core to apply a portion of an annular bead in desired possition on a tire carcass positioned on the building core, means associated with said grooved roll to releasably support the free portion of the bead annulus in spaced relation to the building core, said means comprising a freely rotatable roll spaced, circumferentially of the core, from said grooved roll but adjacent the bead portion of the tire carcass, said grooved roll being adapted upon rotation of the building core to progressively apply the annular bead to the tire carcass, and said supporting roll being formed to release the bead annulus as the point of first application approaches, to permit the grooved roll to complete the application of the bead.

6. A device for applying annular bead elements to a tire carcass comprising a bead setting roll adapted to be moved into operative relation with a tire supporting core to apply a portion of an annular bead in desired position on a tire carcass positioned on said core, a bead supporting roll positioned adjacent the bead portion of the tire carcass and spaced, circumferentially of the core, from the bead setting roll, and a finger positioned intermediate of the bead supporting roll and the bead setting roll, the latter roll being adapted, upon rotation of the core, to progressively apply the annular bead to the tire carcass, and said supporting roll and finger adapted to maintain the free portion of the bead annulus in spaced relation to the tire carcass and so formed as to release the bead annulus as the point of first application approaches to permit the bead setting roll to complete the application of the bead.

7. A device for applying annular bead elements to a tire carcass comprising a bead setting roll adapted to be moved into operative relation to a tire supporting core to apply a portion of an annular bead in desired position on a tire carcass positioned on said core, a yieldingly mounted bead supporting roll positioned adjacent the bead portion of the tire carcass and spaced, circumferentially of the core, from the bead setting roll, and a resilient finger positioned intermediate of the bead supporting roll and the bead setting roll the latter roll being adapted upon rotation of the core to progressively apply the annular bead to the tire carcass, said supporting roll and finger being adapted to maintain the free portion of the bead annulus in spaced relation to the tire carcass and so formed as to release the bead annulus as the point of first application approaches to permit the bead setting roll to complete the application of the bead.

In testimony whereof I have signed my name to the above specification.

PAUL W. LEHMAN.